United States Patent

Mailfert

[11] 3,904,898
[45] Sept. 9, 1975

[54] LINEAR ELECTRIC MOTORS

[75] Inventor: Alain Mailfert, Morsang-sur-Orge, France

[73] Assignee: Agence Nationale de Valorisation de la Recherche (ANVAR), France

[22] Filed: Aug. 5, 1974

[21] Appl. No.: 495,095

[30] Foreign Application Priority Data
Aug. 10, 1973   France .............................. 73.29388

[52] U.S. Cl. .............. 310/12; 104/148 LM; 310/52
[51] Int. Cl.² ......................................... H02K 41/02
[58] Field of Search .....104/148 LM, 148 MS, 148 SS; 310/12, 13, 16, 52, 10, 40, 198, 163; 335/216

[56] References Cited
UNITED STATES PATENTS

| | | | |
|---|---|---|---|
| 3,589,300 | 6/1971 | Wipf | 310/13 X |
| 3,644,766 | 2/1972 | Hughes | 310/163 X |
| 3,768,417 | 10/1973 | Thornton et al. | 335/216 X |
| 3,850,109 | 11/1974 | Thornton | 104/148 SS |

*Primary Examiner*—R. N. Envall, Jr.
*Attorney, Agent, or Firm*—Larson, Taylor and Hinds

[57] ABSTRACT

The motor has an active stationary conductive track and an assembly carried by the vehicle to be driven along the track. The assembly includes a superconducting DC field winding located in a cryostat and rotating with the cryostat around an axis parallel to the track and perpendicular to the direction of movement of the vehicle. The assembly also has an auxiliary polyphase winding parallel to the track and wound so as to create a field, synchronous with the field of the inductor. The auxiliary polyphase winding may be flat or arcuate.

9 Claims, 6 Drawing Figures

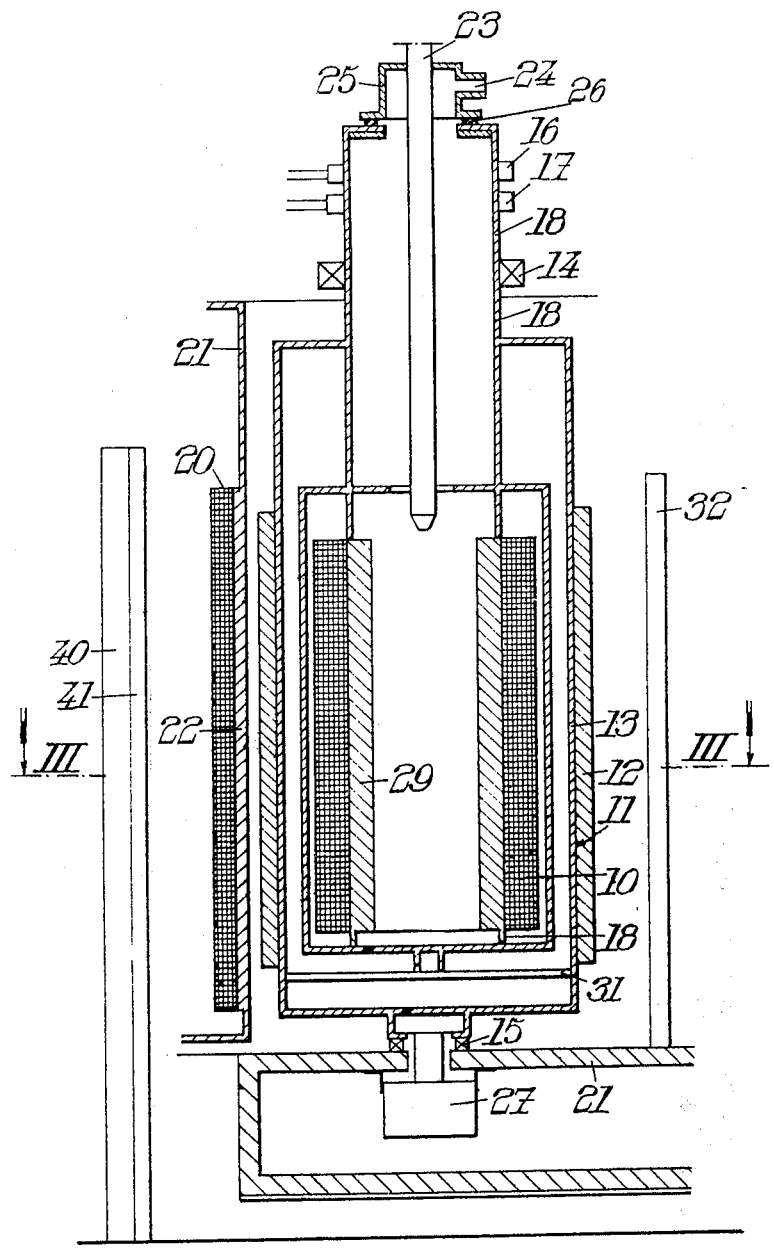

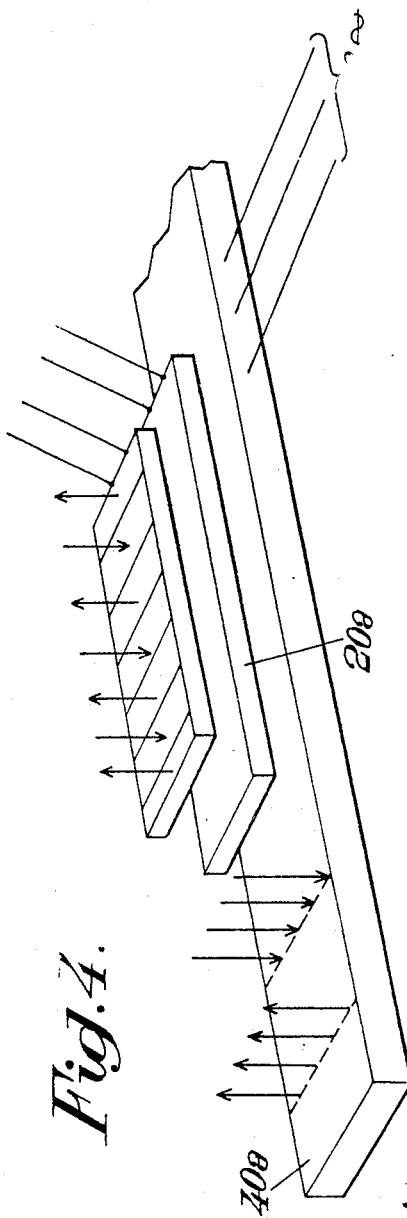
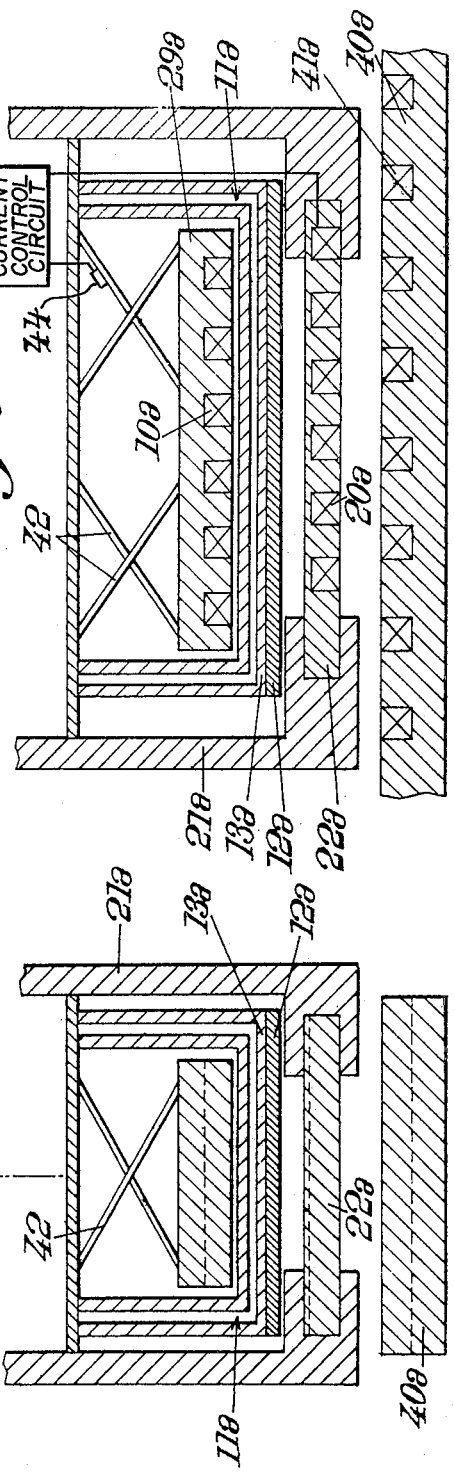

LINEAR ELECTRIC MOTORS

BACKGROUND OF THE INVENTION

The present invention relates to linear electric motors which convert the electrical power that they receive in the form of alternating voltages and currents in stationary windings carried by a linear track into mechanical power to cause a linear translatory movement of another winding carried by a vehicle. It more particularly relates to such motors which include a superconducting field winding on the vehicle. The operation of the motor is not accompanied by any external electrical supply from the track or by any taking up of energy in electrical form on the latter.

Superconductors have already been evaluated for constituting windings of a rotary electric machine which are subjected to steady or slowly variable magnetic fields. However, it has not been possible to use superconductors for windings which are subjected to variable magnetic fields, such as the armature of synchronous machines and the armature and rotor winding of an asynchronous machine, due to the magnetic hysteresis of the superconducting materials.

"Conventional" linear motors (without a superconducting winding) have also been proposed for use in driving vehicles along an active track, i.e. a track connected to an electrical power source. The track then includes polyphase windings supplied with AC currents for generating a sliding field. In a conventional asynchronous motor of that type, the vehicle is provided with fixed windings confronting the track, in which the sliding field induces electromotive forces and currents whose interaction with the track magnetic field results in a driving force exerted on the vehicle and having the direction of the sliding field.

Such motors have drawbacks: a narrow air gap should be retained and it prevents giving the suspension of the vehicle a large latitude of movement, while a large air gap renders conception more satisfactory and enhances safety in operation for a high speed transportation system. A ferromagnetic circuit should be included in the track, thereby increasing the cost and the self inductance and reducing the cos $\phi$.

Conventional linear synchronous motors have also been proposed: DC multipolar windings are then fixed to the vehicle and deliver a force in the direction of the sliding field upon synchronism. However, the cosine $\phi$ is low and the electricity consumption aboard the vehicle is excessive.

It is an object of the present invention to provide an improved linear electric motor which includes a superconducting field winding and is improved with respect to the prior systems.

It is a further object of the invention to provide a linear electric motor improved by having very high power per unit volume and cosine $\phi$ as a result of the use of a superconducting winding which is subject only to a substantially constant magnetic field in permanent operation, and is furthermore not subject to any considerable mechanical torque.

SUMMARY OF THE INVENTION

A linear electric motor comprises a stationary track having polyphase windings adapted to provide a sliding magnetic field and an assembly carried by the vehicle. The assembly comprises:

a superconducting field winding located in a cryostat and adapted to provide a magnetic field synchronous with said sliding field, a winding of conventional electrically conducting material substantially parallel to the track and connected to the vehicle for simultaneous movement along the track, located between said field winding and track, and means for circulating currents in said auxiliary windings.

Such a motor, permitting a large air gap, has, due to the reduced volume of the field winding for a given induction, a power per unit volume very much higher than that of conventional motors and has a very high cosine $\phi$, the reactive power necessary for its operation being negligible.

In addition, there is no transmission of substantial efforts between the chassis of the vehicle and the superconducting field winding. Consequently, the connecting structure may be light and have a high resistance to heat flow, while the power to be delivered to the auxiliary winding is a fraction only of that necessary in a conventional linear motor.

The motor may be asynchronous. Then said field winding is cylindrical and mounted on the vehicle for rotation about an axis transverse to the direction of movement of the vehicle and parallel to the track; said auxiliary windings are connected to adjustable resistors for improving operation during start and speed-up and permitting adjustment of speed. The auxiliary winding is typically flat and parallel to the track for simplification purposes. However, it may also be arcuate and its overall shape may be intermediary between a flat shape and a cylinder coaxial with the field winding.

The motor may also be synchronous. Then, the auxiliary winding is substantially flat and means carried by the vehicle are provided for circulating in said auxiliary winding DC currents of such value that they render the resulting forces transmitted from the superconducting winding to the vehicle substantially equal to zero.

The invention will be better understood from the following description of preferred embodiments of the invention given by way of non-limiting examples.

SHORT DESCRIPTION OF THE DRAWINGS

FIG. 2 is a diagrammatic view in section along a plane passing through the axis of the field winding of the motor of FIG. 1;

FIG. 4 is a highly schematic view indicating the relative position of the main components of a synchronous motor according to another embodiment of the invention;

FIG. 5 is a schematic view in section along a plane perpendicular to the track; and FIG. 6 is a schematic view in section along line VI—VI of FIG. 5.

Figure 1:
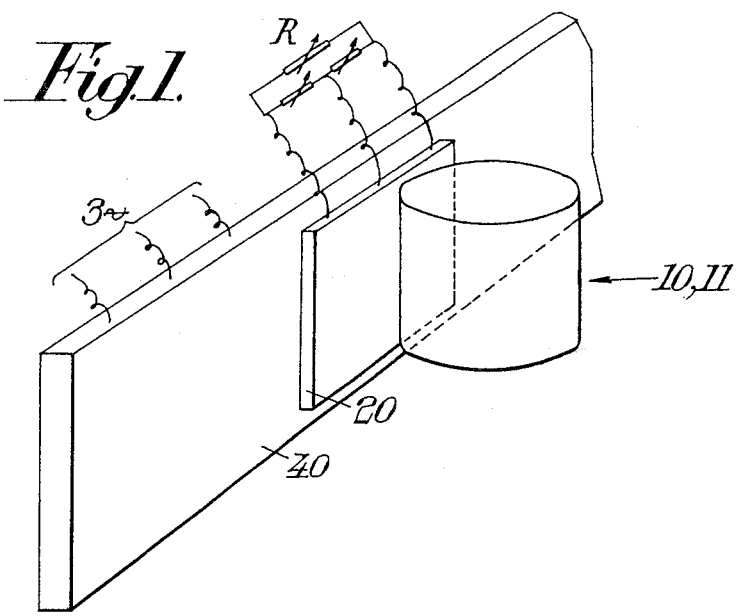
FIG. 1 is a simplified diagram of an asynchronous linear motor according to a first embodiment of the invention.
Figure 3:
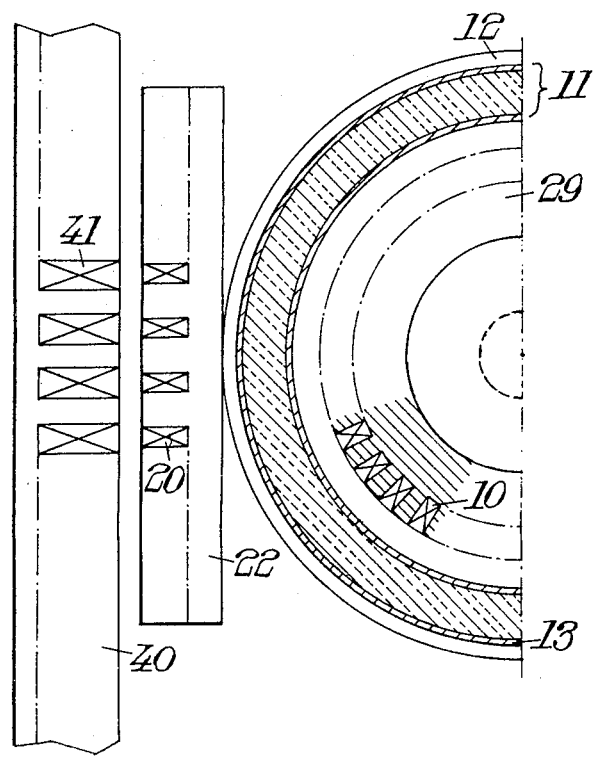
FIG. 3 is a diagrammatic view in section, along line III—III of FIG. 2.

Referring to FIGS. 1, 2 and 3, the motor comprises a rotary assembly of generally cylindrical shape, which comprises, arranged coaxially from the axis, a field winding 10 contained in a cryostat 11, and an electrically conducting shield 12 fast with the outer wall 13 of the cryostat. The illustrated rotary assembly has a vertical axis, but it could just as well have a horizontal axis; the driving or active track — which here is vertical — would then be horizontal.

By way of example, it will be assumed that the inductor has one pair of poles only, but it could just as well have several pairs of poles.

The rotary assembly is provided with a lower shaft which, in the illustrated embodiment, is used for starting the field winding 10, as will be seen below. The rotary assembly is supported and guided in rotation by a lower thrust bearing 15 and by a large diameter upper thrust bearing 14. Both are sufficiently spaced from the field winding 10 for the magnetic flux which passes through them to be low. The bearings are carried by the chassis 21 of the vehicle to be driven; a fraction only of that chassis is shown in FIG. 2.

The portion of the motor carried by the vehicle comprises also a polyphase winding 20 provided to transmit to the chassis the tractive force exerted by the motor. The winding 20 must be fixed firmly to the chassis, which does not present difficulties, since it is not of superconducting material and that in consequence it is not necessary to keep it at very low temperature. The winding 20 is located between the inductor 10 and the fixed track 40. In the embodiment illustrated in FIGS. 1 to 3, it is of flat shape, but it could as well have a shape intermediate between that of the track (i.e. flat) and that of the field winding 10. As is shown in FIG. 3, the conductors of winding 20 are placed in the slots of a body 22 typically of reinforced insulating material, or of magnetic or non-magnetic steel. If it is of steel, it must be laminated to avoid eddy current losses. The winding 20 is of electrically good conducting material (copper or aluminum), cooled by circulation of air or of a cooling fluid (water or oil). The winding 20 is connected to variable resistors R (FIG. 1) which fulfill the same function as the starting resistors of a conventional coiled rotor asynchronous motor.

The portion of the motor carried by the vehicle also comprises a fixed electromagnetic shield 32 of approximately semi-circular shape designed to dampen the rotary magnetic field produced by the rotation of the field winding 10. The shield 32 can be of laminated ferromagnetic material. However, it is preferable, to avoid the appearance of forces tending to urge the field winding against the shield 32, to use a solid shield of electrically good conducting non-ferromagnetic material. The eddy currents which are created therein by the rotation of the inductor tend to compensate the magnetic distrubances created by the rotary field outside the system.

The field winding 10 and a mandrel 29 which carries it are enclosed in the cryostat 11. The mandrel 29 is fixed to the outer wall 13 of the cryostat by centering members having a large thermal resistivity. In the embodiment illustrated in FIG. 2, a jacket 18 projects above the cryostat, bears the slip rings of the sliding contact assemblies 16 and 17 and is rotatably supported by the bearing 14; said members also comprise thin partitions 31.

In the embodiment illustrated in FIGS. 2 and 3, the outer wall 13 of the cryostat bears the shield 12. In a modified embodiment (not illustrated) the outer wall 13 is a cylinder of electrically good conducting material (aluminum alloy for example) of sufficient thickness to constitute the magnetic shield 12. A shield is necessary since, due to the hysteresis observed in the magnetic behaviour of superconductors, the winding should not be subjected to rapidly varying magnetic field. It may be noted that those superconducting alternators which have already been developed also comprise an electromagnetic shield for damping the effects of the stray magnetic fields produced by the armature.

Thermal insulation is provided between the inner wall and the outer wall of the cryostat. It may consist of double wall jacket under vacuum, containing laminated material according to the so-called superisolation technique. The shaft of the field winding and the connecting members between the winding 10 and the outer wall 13 of the cryostat must be of small cross-section, and formed for example of stainless steel of low thermal conductivity. Under steady state conditions, no torque is exerted on the field winding, which permits connections of low mechanical strength.

The cryostat is provided with a cryogenic fluid supply circuit to maintain superconducting temperatures. As illustrated diagrammatically in FIG. 2, the circuit comprises a central pipe 23 placed axially of the jacket 18 and which opens inside the mandrel 29 bearing the field winding 10. Cryogenic fluid (liquid helium or, better, hypercritical helium) is injected into the pipe. Vaporised helium flows back into the space comprised between the pipe 23 and the jacket 18 which is advantageously provided with an insulating covering. Gaseous helium is removed through a pipe 24 which opens into a fixed collector 25 cooperating with the terminal surface of the jacket 18 through a rotary fluid-tight seal 26.

Whatever the solution adopted to supply the field winding 10 during speed up, winding 10 is typically provided with a superconducting switch (not shown) open during current and speed increase and which is closed at steady conditions so as to short circuit the inductor winding and trap the magnetic flux necessary for operation. At the same time, the supply is interrupted.

The driving or active track 40 has a polyphase coil system 41 consisting of several windings of electrically conducting material (copper or aluminum). The conductors of the coil system 41 are located in slots of a beam anchored to the ground for taking the reaction thrust. The beam may be of insulating material (resin reinforced with glass fiber for instance).

The windings are supplied by a stationary source of AC electrical currents (not shown) of sufficient power. The winding system 41 may have any construction appropriate to create a sliding field and need not be described. A three-phase winding assembly will typically be used, adapted to provide a field whose spacing between successive poles is equal to that of winding 20.

The operation of the motor which has just been described being apparent from the foregoing description, it will only be briefly indicated. It will appear better if it is remembered that the motor, although asynchronous, includes a rotary field winding 10, which permanently rotates at a speed such that it is in synchronism with the sliding field, which implies starting it, before starting up of the vehicle, up to a speed which corresponds to a peripheral linear speed equal to that of the sliding field.

The vehicle being at rest, the rotary assembly may be started up and brought to the speed of synchronism by means of the auxiliary motor 27 associated with the terminal portion of the shaft and supplied by a source carried on board the vehicle. The conducting shield 12 may also be used as a squirrel cage rotor.

The rotary field winding is started up to synchronism while the polyphase winding 20 is open circuited. After synchronism is approximately reached, the winding 20 is closed on starting resistors R whose resistance is progressively decreased as the vehicle speed increases.

Referring now to FIGS. 4–6, where the components corresponding to those of FIGS. 1–3 are designated by the same reference numeral with the index *a* added thereto, there is illustrated a synchronous linear motor having an active track 40*a*, a field winding 10*a*, an auxiliary multipolar winding 20*a* which transmits to the vehicle the force exerted by the motor. The auxiliary winding is substantially flat and is secured to the chassis. The superconducting field winding 10*a* is flat and is secured to the vehicle by struts 42. The number of poles of the field winding is equal to the number of poles of the auxiliary winding. As shown in FIG. 6, the spacing between the poles of the field winding 10*a* and the spacing between the poles of the auxiliary winding are equal. The poles of the auxiliary winding are longitudinally offset with respect to the poles of the superconducting winding by an amount equal to one fourth of said spacing.

Means carried by the vehicle, which may be a conventional servocircuit 43, circulates DC currents in the auxiliary winding 20*a* and adjusts the current to a value which renders the resulting forces transmitted from the field winding 10*a* to the chassis of the vehicle substantially equal to zero. For that purpose, the circuit may be responsive to a detector 44 of said forces.

During the initial speed rise, the inductor 10 must be supplied by a current source carried by the vehicle (not shown) through sliding contacts 16, 17, with later short-circuiting by a superconducting switch, (not shown) after steady state has been attained.

I claim:

1. In a linear electric motor comprising a stationary track having polyphase windings adapted to provide a sliding magnetic field when fed with polyphase AC currents from an external source, an assembly carried by a vehicle to be driven along said track and comprising:

a superconducting field winding located in a cryostat and adapted to provide a magnetic field synchronous with said sliding field, auxiliary winding of conventional electrically conducting material substantially parallel to the track and connected to the vehicle for simultaneous movement along the track, located between said field winding and track, and means for circulating currents in said auxiliary windings.

2. Asynchronous electric motor according to claim 1, wherein said field winding is cylindrical and mounted on the vehicle for rotation about an axis transverse to the direction of movement of the vehicle and parallel to the track, and wherein said auxiliary windings are connected to adjustable resistors for improving operation during start and speed-up and permitting adjustment of speed.

3. Motor according to claim 2, wherein the auxiliary polyphase winding is flat and parallel to the track.

4. Motor according to claim 2, wherein the auxiliary winding is arcuate and its shape is intermediary between the shape of the track and the outside shape of the field winding.

5. Machine according to claim 2, characterised by means for starting up the inductor up to the frequency of synchronism with the field of the track winding.

6. Motor according to claim 2, comprising means for electrical supply of the auxiliary winding secured to the vehicle with DC current under synchronous conditions.

7. Synchronous motor according to claim 1, wherein said auxiliary winding is substantially flat and wherein means carried by the vehicle are provided for circulating in said auxiliary winding DC currents of such value that they render the resulting forces transmitted from the superconducting winding to the vehicle substantially equal to zero.

8. Synchronous electric motor according to claim 7, wherein said superconducting winding is flat and secured to the vehicle and wherein said superconducting winding has a number of poles equal to the number of poles of the auxiliary winding, the spacings between the poles are equal and the poles of the auxiliary winding are offset from the poles of the superconducting winding by a distance equal to one quarter of said spacing.

9. Synchronous motor according to claim 7, wherein said DC current is adjusted by servo-means responsive to a detector of said forces.

* * * * *